United States Patent
Dudgeon et al.

(10) Patent No.: US 10,162,746 B2
(45) Date of Patent: *Dec. 25, 2018

(54) ALLOCATING ADDITIONAL REQUESTED STORAGE SPACE FOR A DATA SET IN A FIRST MANAGED SPACE IN A SECOND MANAGED SPACE

(71) Applicant: International Business Machines Corporation, Armonk, NY (US)

(72) Inventors: Kyle B. Dudgeon, Vail, AZ (US); David C. Reed, Tucson, AZ (US); Esteban Rios, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 130 days.

This patent is subject to a terminal disclaimer.

(21) Appl. No.: 15/422,390

(22) Filed: Feb. 1, 2017

(65) Prior Publication Data

US 2017/0139623 A1     May 18, 2017

Related U.S. Application Data

(63) Continuation of application No. 14/071,625, filed on Nov. 4, 2013, now Pat. No. 9,672,144, which is a
(Continued)

(51) Int. Cl.
*G06F 12/00* (2006.01)
*G06F 12/02* (2006.01)
*G06F 3/06* (2006.01)

(52) U.S. Cl.
CPC .......... *G06F 12/023* (2013.01); *G06F 3/0605* (2013.01); *G06F 3/0619* (2013.01);
(Continued)

(58) Field of Classification Search
None
See application file for complete search history.

(56) References Cited

U.S. PATENT DOCUMENTS

| 5,506,986 A | 4/1996 | Healy |
| 5,717,888 A | 2/1998 | Candelaria et al. |

(Continued)

FOREIGN PATENT DOCUMENTS

| CN | 101957728 A | 1/2011 |
| CN | 102696009 A | 9/2012 |

OTHER PUBLICATIONS

"Preventing VSAM End-of-Volume Errors with BMC MAINVIEW SRM StopX37/11", BMC software, White Paper, [retrieved online Jan. 19, 2013], http://documents.bmc.com/products/documents/82/71/58271/Output/090 . . . , pp. 1-16.
(Continued)

*Primary Examiner* — Daniel D Tsui
(74) *Attorney, Agent, or Firm* — David W. Victor; Konrad Raynes Davda & Victor LLP

(57) ABSTRACT

Provided are a computer program product, system, and method for allocating additional requested storage space for a data set in a first managed space in a second managed space. A request for additional storage space is received for a requested data set stored in a first managed space in the storage. A revised amount of storage space for the requested data set comprises at least an amount of space currently allocated to the requested data set in the first managed space and the requested additional storage space. If the revised amount of storage space exceeds a value, then allocation is made of the revised amount of storage space in allocated storage space in a second managed space of the storage. The data set is stored in the allocated storage space in the second managed space.

20 Claims, 6 Drawing Sheets

Related U.S. Application Data continuation of application No. 13/757,638, filed on Feb. 1, 2013, now Pat. No. 9,665,477.

(52) U.S. Cl.
CPC .......... *G06F 3/0631* (2013.01); *G06F 3/0665* (2013.01); *G06F 3/0683* (2013.01); *G06F 3/0689* (2013.01)

(56) References Cited

U.S. PATENT DOCUMENTS

| | | |
|---|---|---|
| 8,346,721 B2 | 1/2013 | Acedo et al. |
| 8,769,225 B2 | 7/2014 | Anderson et al. |
| 2012/0173833 A1 | 7/2012 | Lehr et al. |
| 2013/0173805 A1 | 7/2013 | Bohling et al. |
| 2014/0223130 A1 | 8/2014 | Dudgeon et al. |
| 2014/0223133 A1 | 8/2014 | Dudgeon et al. |

OTHER PUBLICATIONS

"Space Management of Extended Address Volumes (EAVs)", IBM Corporation, z/OS V1R12.0 DFSMShsm Storage Administration, Document No. SC35-0421-11, [retrieved online Jan. 19, 2013], http://publib.boulder.ibm.com/infocenter/zos/v1r12/topic/com.ibm.zos/r1 . . . , pp. 1-2.

"Extended Address Volumes", IBM Corporation, z/OS V1R11.0 DFSMS Using Data Sets z/OS V1R10.0-V1R11.0 Document No. SC26-7410-09, [retrieved online Jan. 19, 2013], http://publib.boulder.ibm.com/infocenter/zos/v1r11/topic/com.ibm.zos/r1 . . . , pp. 1-3.

"DFSMS Extended Address Volumes", IBM Corporation, z/OS V1R11.0 Introduction and Release Guide z/OS V1R10.0-V1R11.0, Document No. GA22-7502-17, [retrieved online Jan. 19, 2013], http://publib.boulder.ibm.com/infocenter/zos/v1r11/topic/com.ibm.zos/r1 . . . , pp. 1-2.

"DFSMS Using Data Sets", IBM Corporation, Document SC26-7410-09, Sep. 2009, pp. 1-720.

"Introduction and Release Guide", IBM Corporation, Version!, Release 11, Document No. GA22-7502-17, Sep. 2009, pp. 1-146.

Chinese Office Action dated Jun. 12, 2016, pp. 10, for Application Serial No. 201410041298.0, filed Jan. 28, 2014.

Information Materials for IDS document dated Jun. 16, 2016, pp. 2, for Chinese Office Action dated Jun. 12, 2016, pp. 10, for Application Serial No. 201410041298.0, filed Jan. 25, 2014.

U.S. Pat. No. 8,769,225 is the US counterpart of CN102696009A.

U.S. Pat. No. 8,769,225 is the US counterpart of CN101957728A.

English machine translation of CN102696009A.

English machine translation of CN101957728A.

MachineTranslation of Chinese Office Action dated Jun. 12, 2016, pp. 10, for Application Serial No. 201410041298.0, filed Jan. 28, 2014.

Chinese Search Report for Application Serial No. 201410041298.0, filed Jan. 28, 2014.

U.S. Appl. No. 13/757,638, filed Feb. 1, 2013.

Office Action dated Apr. 30, 2015, pp. 25, for U.S. Appl. No. 13/757,638, filed Feb. 1, 2013.

Response dated Jul. 30, 2015, pp. 10, to Office Action dated Apr. 30, 2015, pp. 25, for U.S. Appl. No. 13/757,638, filed Feb. 1, 2013.

Office action dated May 12, 2016, pp. 17, for U.S. Appl. No. 13/757,638, filed Feb. 1, 2013.

Response dated Aug. 12, 2016, pp. 11, to Office action dated May 12, 2016, pp. 17, for U.S. Appl. No. 13/757,638, filed Feb. 1, 2013.

Notice of Allowance dated Jan. 25, 2017, pp. 13, for U.S. Appl. No. 13/757,638, filed Feb. 1, 2013.

U.S. Appl. No. 14/071,625, filed Nov. 4, 2013.

Office Action dated Apr. 30, 2015, pp. 20, for U.S. Appl. No. 14/071,625, filed Nov. 4, 2013.

Response dated Jul. 30, 2015, 7, to Office Action dated Apr. 30, 2015, pp. 20, for U.S. Appl. No. 14/071,625, filed Nov. 4, 2013.

Office Action dated May 12, 2016, pp. 17, for U.S. Appl. No. 14/071,625, filed Nov. 4, 2013.

Response dated Aug. 12, 2016, 7, to Office Action dated May 12, 2016, pp. 17, for U.S. Appl. No. 14/071,625, filed Nov. 4, 2013.

Notice of Allowance dated Jan. 27, 2017, pp. 13, for U.S. Appl. No. 14/071,625, filed Nov. 4, 2013.

ALLOCATING ADDITIONAL REQUESTED STORAGE SPACE FOR A DATA SET IN A FIRST MANAGED SPACE IN A SECOND MANAGED SPACE

BACKGROUND OF THE INVENTION

1. Field of the Invention

The present invention relates to a computer program product, system, and method for allocating additional requested storage space for a data set in a first managed space in a second managed space.

2. Description of the Related Art

In certain computing environments, multiple host systems may configure data sets in volumes configured in a storage system, such as interconnected storage devices, e.g., a Direct Access Storage Device (DASD), Redundant Array of Independent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage. For Virtual Storage Access Method (VSAM) data sets, the z/OS operating system provides VSAM volume data sets (VVDS) stored in a data set to provide information on VSM key sequenced data sets. (Z/OS is a registered trademark of IBM in the United States and other countries)

Certain volumes may be configured as an extended address volume (EAV) that is divided into a track managed space and a cylinder managed space. In track managed space, storage space on the volume is managed in tracks and cylinders and each data set occupies an integral multiple of tracks. Track managed space also exists in non-EAV volumes. In the cylinder managed space, data in the volume is managed only in units comprising cylinders. A break point value (BPV) may be used to determine whether a request for a data set is directed to the track managed space or cylinder managed space, such that if the size is more than the BPV, the system prefers the cylinder managed space for that extent. This rule applies to each request for primary or secondary space for data sets that are eligible for the cylinder-managed space. If cylinder-managed space is insufficient, the system uses the track-managed space or uses both types of spaces. When the size of a disk space request is less than the breakpoint value, the system prefers to use the track-managed space. If space is insufficient, the system uses the cylinder-managed space or uses both types of spaces.

SUMMARY

Provided are a computer program product, system, and method for allocating additional requested storage space for a data set in a first managed space in a second managed space. A request for additional storage space is received to allocate to a requested data set stored in a first managed space in the storage. A determination is made of a revised amount of storage space for the requested data set comprising at least an amount of space currently allocated to the requested data set in the first managed space and the requested additional storage space. A determination is made as to whether the revised amount of storage space exceeds a value. In response to determining that the revised amount of storage space exceeds the value, allocation is made of the revised amount of storage space in allocated storage space in a second managed space of the storage. The data set is stored in the allocated storage space in the second managed space.

DETAILED DESCRIPTION

Described embodiments provide techniques for allocating additional storage space to a data set residing in a first managed space in a second managed space. First managed space is intended for storing smaller data sets than a second managed space of a volume. If the currently allocated space and additional requested space exceed a value, used to determine whether to store a data in the second managed space, then space is allocated in the second managed space to store the currently allocated data for the data set and data written to the additional requested space. New data to write may be written at an offset in the allocated storage space in the second managed space to a location following where the preexisting data in the data set will be stored. The preexisting data for the data set in the first managed space may be migrated at a later time, such as when the data set closes so as not to effect performance of current access to the data set.

Figure 1:
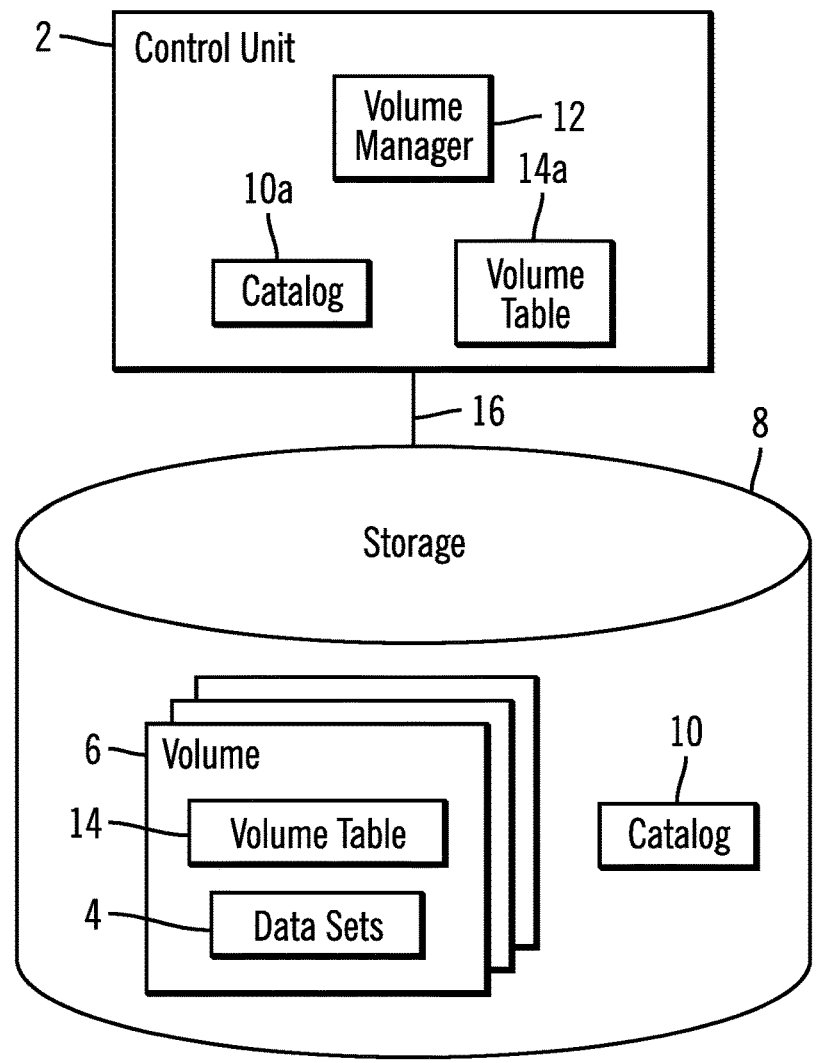
FIG. 1 illustrates an embodiment of a computing environment.

FIG. 1 illustrates an embodiment of a computing environment. Control unit 2, such as a storage controller or server, manages access to data sets 4 in volumes 6 in a storage 8 by hosts (not shown). A catalog 10, stored in the storage 8 and loaded into the control unit 2 as catalog 10a, provides information on data sets 4 stored in volumes 6 configured in storage space in the storage 8. A data set 4 comprises a collection of data intended to be stored in a same logical allocation of data, such as data from a single application, user, enterprise, etc. A data set 4 may be comprised of separate files or records, or comprise a single file or record. The data sets 4 may comprise indexed data sets that are indexed according to a primary key that is used to locate records in the data set 4. Data set indexes provide an index for each indexed data set 10. For instance, in IBM z/OS DFSMS implementations, the data set may comprise a Key Sequenced Data Set (KSDS) used in the IBM Virtual Storage Access Method (VSAM) storage, where each record in the KSDS data set has a unique key used to locate the record in the data set 4.

The control unit 2 includes a volume manager 12 to manage the storage of data sets 4 in the volumes 6.

Each volume 6 includes a volume table 14 having information on the volume 6 to which it pertains, including a mapping of tracks and extents of tracks to data sets 4. The volume table 14 may be stored in the volume 6, such as in the first few records of the volume, as in the case of a volume table of contents (VTOC), or may be stored as metadata external to the volume 6. The control unit 2 may maintain copies of the volume tables 14*a* to use to manage the data sets 4 in the volumes 6. In z/OS implementations, the volume table 14 may include information on a location of data sets in the volume 6, such as a mapping of extents in the data set to storage locations in the volume. In alternative embodiments, the volume table 14 may comprise other types of file allocation data structures that provide a mapping of data to storage locations, either logical and/or physical storage locations. In this way, the volume table 14 provides a mapping of the data to data sets 4 in the volume 6. The volume table 14 may include volume table records for each volume 6, including a volume name and data set records indicating data sets having extents configured in the volume 6. Each data set record may have information for each data set 4 in a volume 6, including the one or more extents assigned to the data set 4. The extents provide a mapping to tracks in the volume 6. The catalog 10 may further include additional information on the data sets 4 allocated to the volumes 6, such as allocation sizes.

The storage 8 may comprise one or more storage devices known in the art, such as interconnected storage devices (e.g., configured as a DASD, RAID, JBOD, virtualized devices, etc.), as a solid state storage device (SSD) comprised of solid state electronics, such as a EEPROM (Electrically Erasable Programmable Read-Only Memory), flash memory, flash disk, Random Access Memory (RAM) drive, storage-class memory (SCM), etc., magnetic storage disk, optical disk, tape, etc.

The control unit 2 communicates with the storage 8 via connection 16. The connection 16 may comprise one or more networks, such as a Local Area Network (LAN), Storage Area Network (SAN), Wide Area Network (WAN), peer-to-peer network, wireless network, etc. Alternatively, the connection 16 may comprise bus interfaces, such as a Peripheral Component Interconnect (PCI) bus or serial interface. The operating system 4 may comprise suitable operating systems known in the art, such as the International Business Machines ("IBM®") z/OS® operating system. (IBM and z/OS are trademarks of IBM in the United States and foreign countries).

Figure 2:
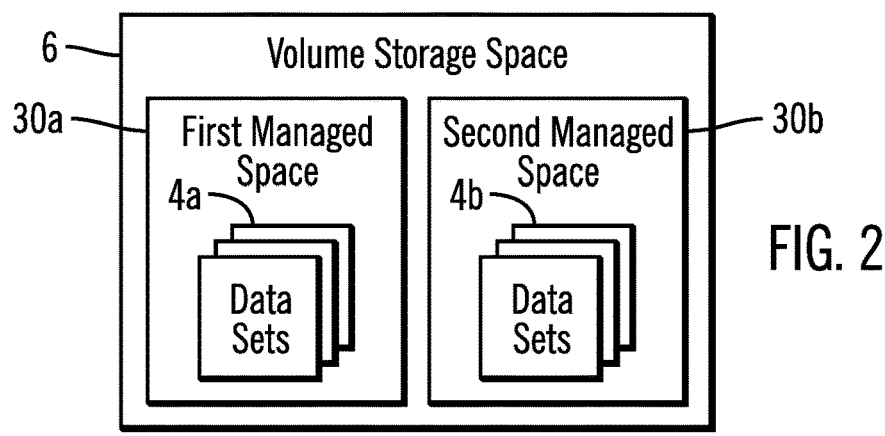
FIG. 2 illustrates an embodiment of a volume storage space.

FIG. 2 provides an embodiment of the volume storage space 6 configured as a first managed space 30*a* and a second managed space 30*b*. The first managed space 30*a* may be intended to store data sets 4*a* that are less than a break point value (BPV) size and the second managed space 30*b* may be intended to store data sets 4*b* that are greater than the breakpoint size. In one embodiment, data is allocated in first storage units in the first managed space 30*a* and allocated in second storage units in the second managed space 30*b*, such that the second storage units include multiple of the first storage units so that a larger storage allocation unit is used for the second managed pace 30*b* than the first managed space 30*a*.

For instance, in an embodiment where the volume 6 comprises an extended address volume (EAV), the volume may be configured as a plurality of cylinders in which tracks are configured. In such embodiments, the first managed space 30*a* may comprise a track-managed space where data is managed in tracks and cylinders and each data set 4*a* occupies an integral multiple of tracks. The second managed space 30*b* may comprise a cylinder managed space managed only in multi-cylinder units where each data set 4*b* occupies an integral multiple of multi-cylinder units. Certain of the volumes 6 may be configured as EAV volumes with first 30*a* and second 30*b* managed spaces and other volumes may be configured with only track managed spaces. The first managed space 30*a* may be assigned a different address range in the volume 6 than the second managed space 30*b*.

Figure 3:
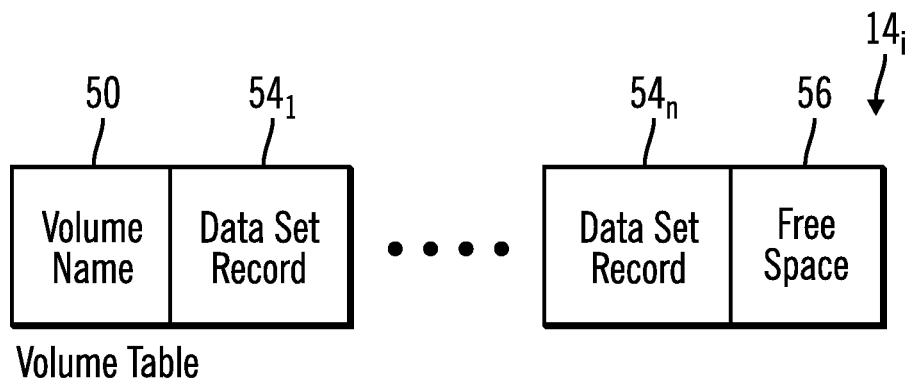
FIG. 3 illustrates an embodiment of a volume table.

FIG. 3 illustrates an arrangement of information maintained in an instance of a volume table 14$_i$ for one volume 6$_i$. The volume table instance 14$_i$ includes a volume name 50, also known as a volume serial number, e.g., a VOLSER, that provides a unique identifier of the volume. The volume name 50 may be included in the name of the volume table 14$_i$ in the volume 6$_i$. The volume table 14$_i$ instance further includes one or more data set records 54$_1$ . . . 54$_n$ indicating data sets having extents configured in the volume 6$_i$ represented by the volume table 14$_i$. The volume table 14$_i$ further includes one or more free space records 56 identifying ranges of available tracks in the volume 6$_i$.

Figure 4:
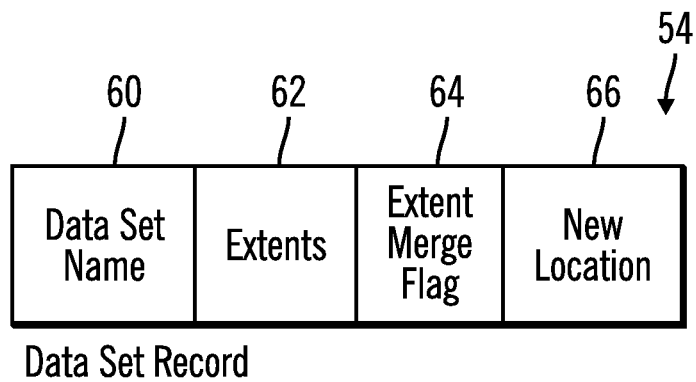
FIG. 4 illustrates an embodiment of a data set record.

FIG. 4 illustrates an embodiment of a data set record 54, such as the data set records 54$_1$ . . . 54$_n$ included in the volume table 24. Each data set record 54 includes a data set name 60 and one or more extents 62 allocated to the data set 54. The extent 62 provides a mapping to tracks in the volume 12 identified by the volume table 20. The tracks indicated in the map may be expressed as disk, cylinder, head and record location (CCHHR). The data set record 54 may further include an extent merge flag 64 indicating whether extents of the data set 60 in the first managed space 30*b* need to be migrated to an indicated new location 66, which may comprise a second managed space 30*b* of the current volume 6 including the data set 60 or another volume.

The reference numeral "n" used herein may refer to any number of instances of an element to which it is attached, and may refer to the same or different number of instances when used with different elements.

Figure 5:
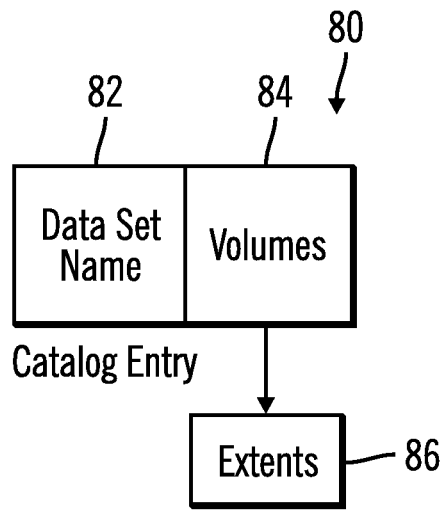

The data set catalog 10 provides information on data sets having extents in one or more volumes 20. FIG. 5 illustrates an embodiment of a catalog entry 80 in the catalog 10, including a data set name 82 and one or more volumes 84 in which the data set 82 is allocated space. The volumes 84 may be listed in the order in which extents from the volume are assigned to the data set 82, and indicate base volume names or alias volume names. Each volume 84 would identity extents 86 in the volume that are assigned to the data set 82. The extents 86 for one volume 84 may be listed in the order in which they are allocated to the data set 82. The catalog 10 may be organized by a key comprising the data set name to allow searching on the data set name to obtain the entry 80 for a data set name.

When creating a data set 4, the host or control unit 2 may create an entry 80 in the catalog 10. The host may then locate a first volume and assign extents to the volume, and indicate the allocated extent 86 in the catalog entry 80 for the created data set 10. The volumes 84 would be used to assign further extents if the current extents assigned to the volume are full. Further, a new volume may be assigned to a data set if the current volumes assigned to the data set are full.

Figure 6A:
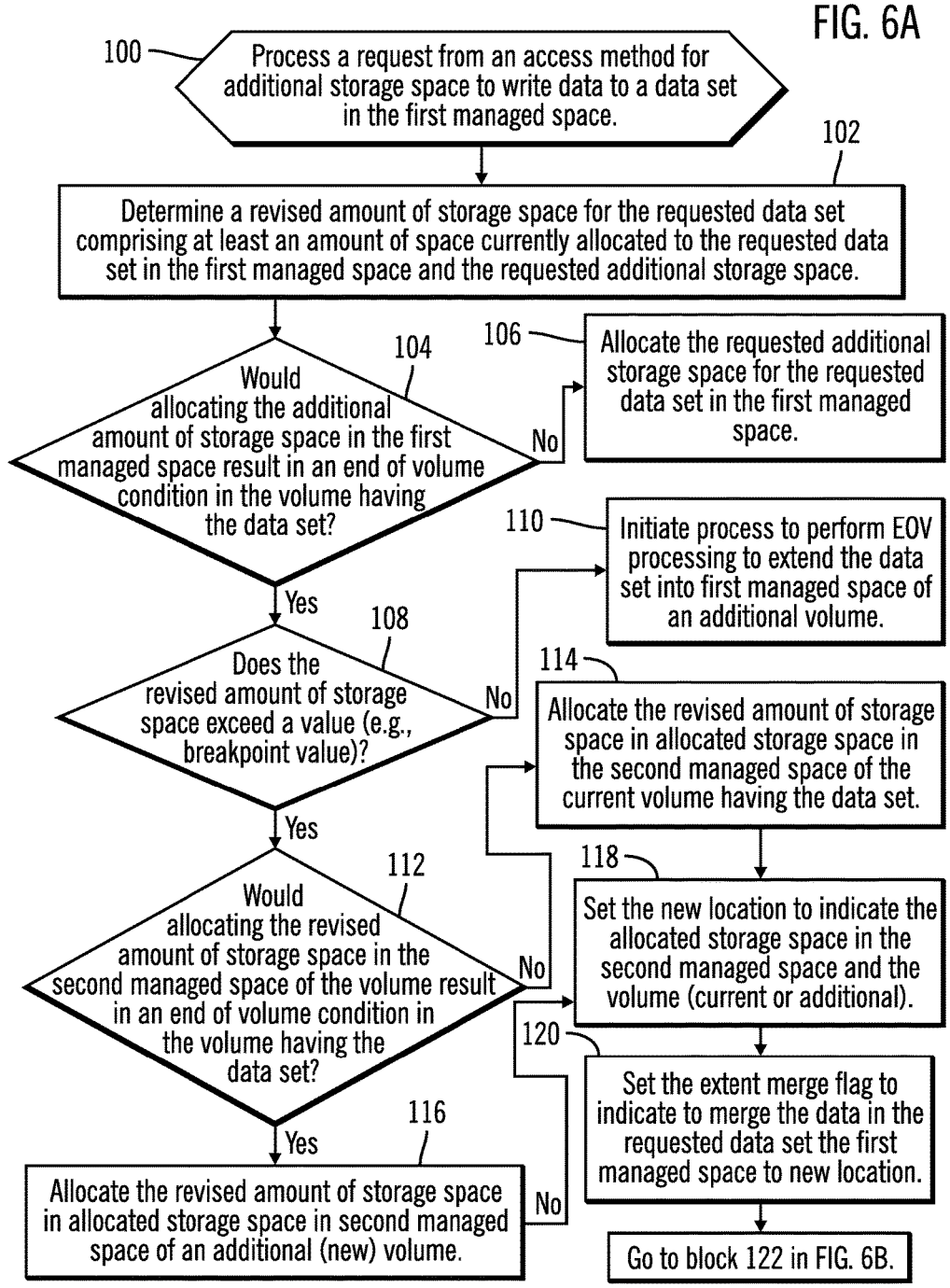
FIGS. 6a and 6b illustrates an embodiment of operations to process a request for additional storage space for a data set.
Figure 6B:
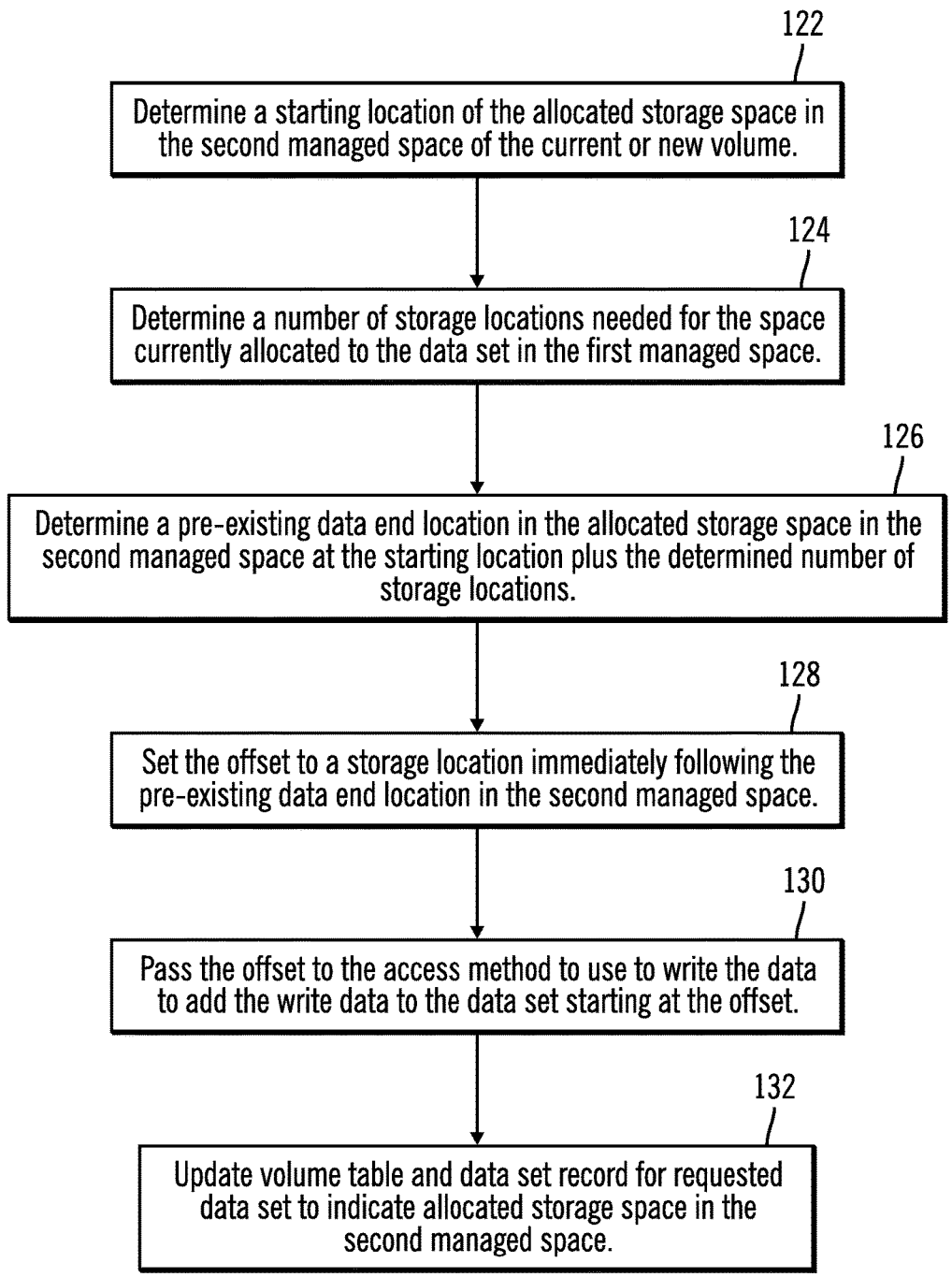

FIGS. 6*a* and 6*b* illustrate an embodiment of operations performed by the volume manager 12 to process a request for additional space for a data set 4. In response to processing (at block 100) a request from an access method for additional storage space to write data to a data set in the first managed space 30*a*, the volume manager 12 determines (at block 102) a revised amount of storage space for the requested data set comprising at least an amount of space currently allocated to the requested data set 4*a* in the first managed space 30*a* and the requested additional storage space. If (at block 104) allocating the additional amount of storage space in the first managed space 30*a* would not result in an end of volume condition in the volume 4a having the data set 4a, then the volume manager 12 allocates (at block 106) the requested additional storage space for the requested data set 4a in the first managed space 30a.

If (at block 104) allocating the additional amount of storage space in the first managed space 30a would result in an end of volume condition in the volume 4a having the data set 4a, then the volume manager 12 determines (at block 108) whether the revised amount of storage space exceeds a value. In one embodiment the compared value may comprise the break point value (BPV) of a data set size that determines whether a data set is stored in the first managed space 30a or the second managed space 30b. If (at block 108) the revised amount of storage space does not exceed the value, then the volume manager 12 initiates (at block 110) a process to perform EOV processing to extend the data set 4a into the first managed space 30a of an additional volume. Alternatively, the data set may be extended into the second managed space 30b to store the requested additional storage space while the pre-existing data may remain in the first managed space 30a when the revised amount of storage space does not exceed the BPV.

If (at block 108) the revised amount of storage space exceeds the value, then the volume manager 12 determines (at block 112) whether allocating the revised amount of storage space in the second managed space 30b of the volume 6 would result in an end of volume condition in the volume 6 having the data set 4a. If there would be no end of volume, then the volume manager 12 allocates (at block 114) the revised amount of storage space in the allocated storage space in the second managed space 30b of the current volume 6 having the data set 4a. If (from the yes branch of block 112) there would be an end of volume event, then the volume manager 12 allocates (at block 114) the revised amount of storage space in the allocated storage space in second managed space 30b of an additional (new) volume because there is not sufficient storage space in the current volume having the requested data set 4a.

After allocating the revised amount of storage in a second managed space 30b (from blocks 114 or 116), control proceeds to block 118 to set the new location 66 to indicate the allocated storage space in the second managed space 30b and the volume (current or additional) having the allocated storage space. The extent merge flag 64 is set (at block 120) to indicate to merge the pre-existing data in the requested data set 4a in the first managed space 30a to the new location 66 in the second managed space 30b.

After allocating the requested additional storage space at block 114 or 116 in the second managed space 30b and setting the new location 66 and extent merge flag 64, control proceeds to block 122 in FIG. 6b to determine an offset in the allocated storage space in for the requested data set in the second managed space 30b to which the access method is to start writing the write data for the additional requested storage space. The offset may follow a location in the allocated storage space in the second managed space 30b to which the pre-existing data, currently in the first managed space 30a, will be stored. To determine the offset, the volume manager 12 determines (at block 122) a starting location of the allocated storage space in the second managed space 30b of the current or new volume. The volume manager 12 determines (at block 124) a number of storage locations needed for the space currently allocated to the data set 4 in the first managed space 30a and determines (at block 126) a pre-existing data end location in the allocated storage space at the starting location plus the determined number of storage locations. The offset is set (at block 128) to a storage location immediately following the pre-existing data end location in the second managed space 30b. The volume manager 12 passes (at block 130) the offset to the access method to use to write data to the data set starting at the offset.

The volume manager 12 may further update (at block 132) the volume table 14 and the data set record 54 for requested data set to indicate the additional allocated storage space for the write data in the second managed space 30b. The additional allocated storage space may be indicated in new extent information 62 for the data set to indicate a storage address in the second managed space 30b and volume having the additional allocation. After allocating space for additional data for a data set 4 in the second managed space 30b, future allocation requests will be extended into the second managed space 30b.

In the embodiments of FIGS. 6a and 6b, additional space is being sought for a data set 4 to accommodate write data from a write request. In alternative embodiments, operations other than a write request may require additional space be allocated to a data set or to extend the data set 4a into the second managed space 30b.

In one embodiment, the operations of FIGS. 6a and 6b may be performed by the end of volume (EOV) routine upon detecting that adding the additional storage space would exceed the break point value. When the EOV routine completes, the volume table 12 is updated at block 132 to indicate that the data for the data set 4 remaining in the first managed space 30a needs to be migrated. In an alternative embodiment, the operations of FIGS. 6a and 6b to allocate additional storage space for a data set 4 in the second managed space 30b may be performed as part of operations other than EOV operations, and may be performed whether or not an EOV would be reached by adding the additional storage space so as to allocate space for the entire data set 4 in the second managed space 30b.

Figure 7:
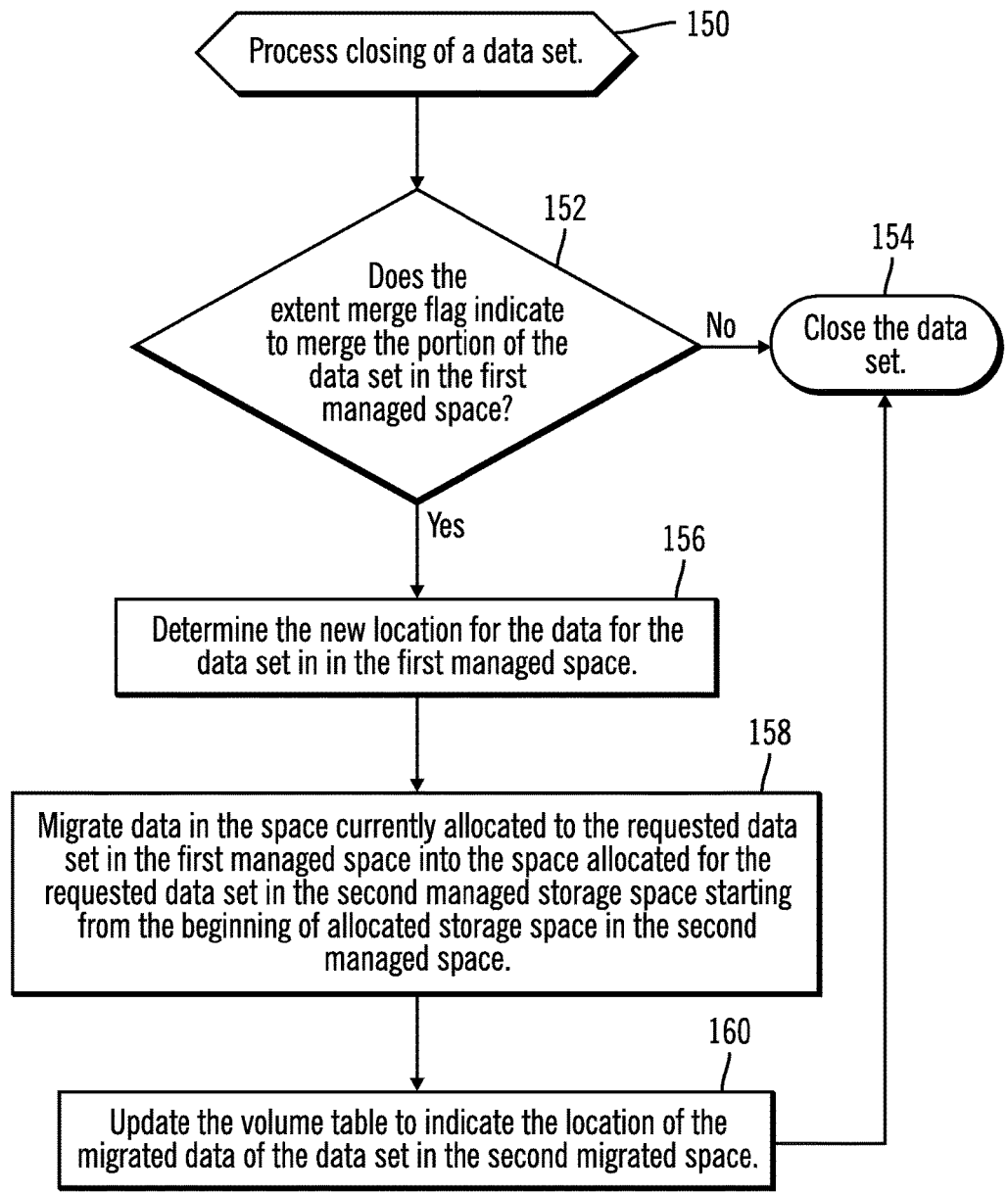
FIG. 7 illustrates an embodiment of operations to process a close of a data set.

FIG. 7 illustrates an embodiment of operations performed by the volume manager 12 to process the closing of a data set 4. Upon processing (at block 150) a close of a data set 4 after an access method, control unit 2 or a host has completed accessing the data set 4, the volume manager 12 determines (at block 152) whether the extent merge flag 64 indicates to merge the portion of the data set 4 in the first managed space 30a. If not, i.e., the extent merge flag 64 is not set, then the volume manager 12 closes the data set 4. If the extent merge flag 64 is set, then the volume manager 12 determines (at block 156) the new location 66 for the data for the data set still maintained in the first managed space 30a. The volume manager 12 migrates (at block 158) in sequence the data in the space currently allocated to the requested data set in the first managed space 30a into the space allocated for the requested data set 4 in the second managed storage 30b space starting from the beginning of allocated storage space in the second managed space 30b. The volume table 14 is updated to indicate the location of the migrated data for the data set 4 in the second managed space 30b allocated for the data set 4.

After the migration, the second managed space 30b contains all of the data for the data set 2. Because the EOV operations of FIGS. 6a and 6b did not have to move the pre-existing data in the first managed space 30a and the data was not migrated until the data set is closed, the migration to the second managed space 30b does not impact performance of the access method operating on the data set 4.

Described embodiments provide techniques to allocate additional storage space for an access request to a data set that is currently allocated in a first managed space to storage space in a second managed data space when adding additional space to the data set would result in the data set having a size eligible for the second managed space. In such case, storage space is allocated in the second managed space to accommodate the space currently allocated to the requested data set in the first managed space and the requested additional storage space. An offset is provided to the access method to write to the allocated storage space in the second managed space before the data in the first managed space is moved to the allocated storage space. The data for the data set in the first managed space may be migrated later, such as when the data set closes, so that the currently existing data for the data set in the first data set is stored before the offset.

Figure 8:
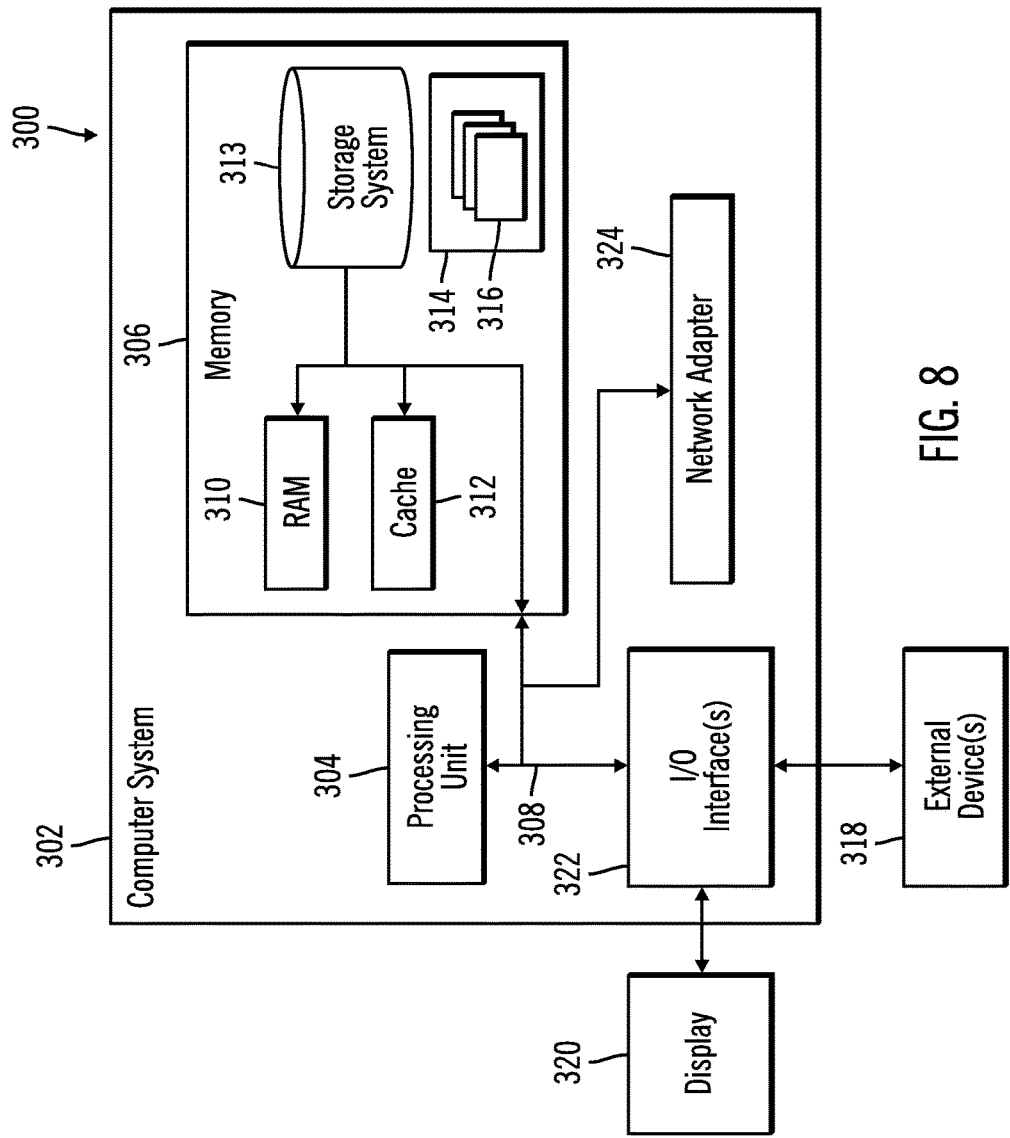
FIG. 8 illustrates a computing environment in which embodiments may be implemented.

FIG. 8 illustrates an embodiment of a computer system 302 which may comprise an implementation of the control unit 2. Alternatively, the control unit 2 may be implemented as a combination of hardware and/or software. The control unit 2 and storage 8 may be implemented in a cloud computing environment in which the control unit 2 and storage 8 provide storage services to connected hosts. Computer node 302 is only one example of a suitable computing node and is not intended to suggest any limitation as to the scope of use or functionality of embodiments of the invention described herein. Regardless, computer node 302 is capable of being implemented and/or performing any of the functionality set forth hereinabove.

The computer node 302 is operational with numerous other general purpose or special purpose computing system environments or configurations. Examples of well-known computing systems, environments, and/or configurations that may be suitable for use with computer node 302 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 302 may be described in the general context of computer system executable instructions, such as program modules, being executed by a computer system. Generally, program modules may include routines, programs, objects, components, logic, data structures, and so on that perform particular tasks or implement particular abstract data types. Computer node 302 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer node 302 is shown in the form of a general-purpose computing device. The components of computer system/server 302 may include, but are not limited to, one or more processors or processing units 304, a system memory 306, and a bus 308 that couples various system components including system memory 306 to processor 304.

Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 302 typically includes a variety of computer system readable media. Such media may be any available media that is accessible by computer node 302, and it includes both volatile and non-volatile media, removable and non-removable media, and may be used for storing the programs and data used by the programs.

System memory 306 can include computer system readable media in the form of volatile memory, such as random access memory (RAM) 310 and/or cache memory 312. Computer node 302 may further include other removable/non-removable, volatile/non-volatile computer system storage media. By way of example only, storage system 313 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 308 by one or more data media interfaces. As will be further depicted and described below, memory 306 may include at least one program product having a set (e.g., at least one) of program modules that are configured to carry out the functions of embodiments of the invention.

Program/utility 314, having a set (at least one) of program modules 316, may be stored in memory 306 by way of example, and not limitation, as well as an operating system, one or more application programs, other program modules, and program data. Each of the operating system, one or more application programs, other program modules, and program data or some combination thereof, may include an implementation of a networking environment. Program modules 316 generally carry out the functions and/or methodologies of embodiments of the invention as described herein, such as the operations of the logging program 8.

Computer node 302 may also communicate with one or more external devices 318 such as a keyboard, a pointing device, a display 320, etc.; one or more devices that enable a user to interact with the computer node 302; and/or any devices (e.g., network card, modem, etc.) that enable computer system/server 302 to communicate with one or more other computing devices. Such communication can occur via Input/Output (I/O) interfaces 322. Still yet, computer node 302 can communicate with one or more networks such as a local area network (LAN), a general wide area network (WAN), and/or a public network (e.g., the Internet) via network adapter 324. As depicted, network adapter 324 communicates with the other components of computer system/server 302 via bus 308. It should be understood that although not shown, other hardware and/or software components could be used in conjunction with computer system/server 302. Examples, include, but are not limited to: microcode, device drivers, redundant processing units, external disk drive arrays, RAID systems, tape drives, and data archival storage systems, etc.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data sets in a storage, the computer program product comprising a computer readable storage medium having computer readable program code embodied therein that executes to perform operations, the operations comprising:
   receiving a request for additional storage space to allocate to a data set stored in a first managed space in the storage;
   determining a revised amount of storage space for the data set comprising at least an amount of space currently allocated to the data set in the first managed space and the additional storage space;
   determining whether the revised amount of storage space exceeds a value;
   allocating, in response to determining that the revised amount of storage space exceeds the value, the revised amount of storage space in allocated storage space in a second managed space of the storage;
   extending the data set including the additional storage space into the first managed space in response to determining that the revised amount of storage space does not exceed the value; and
   storing the data set in the allocated storage space in the second managed space.

2. The computer program product of claim 1, wherein the value comprises a breakpoint value used to determine whether to store a new data set being added to the storage in the first managed space or the second managed space, wherein the new data set is extended into the first managed space if the new data set being added requires less space than the breakpoint value and wherein the new data set is stored in the second managed space if the new data set being added requires more space than the breakpoint value, wherein data is allocated in the first managed space using a first storage unit and data is allocated in the second managed space using a second storage unit, wherein the second storage unit includes multiples of the first storage unit.

3. The computer program product of claim 2, wherein the first managed space comprises a track managed space managed in tracks and cylinders and the data sets stored in the track managed space occupy an integral multiple of tracks and wherein the second managed space comprises a cylinder managed space managed in multi-cylinder units and wherein the data sets stored in the cylinder managed space occupy an integral multiple of cylinders.

4. The computer program product of claim 1, wherein the request for the additional storage space is from an access method seeking to add data to the data set in the additional storage space, wherein the operations further comprise:
   determining an offset in the allocated storage space in the second managed space for the data set; and
   passing the offset to the access method, wherein the access method starts writing the data to add to the data set at the offset in the second managed space.

5. The computer program product of claim 4, wherein the determining the offset comprises:
   determining a starting location of the allocated storage space in the second managed space for the data set;
   determining a number of storage locations needed for space currently allocated to the data set in the first managed space;
   determining a pre-existing data end location in the allocated storage space in the second managed space at the starting location plus the determined number of storage locations; and
   setting the offset to a storage location immediately following the pre-existing data end location in the second managed space.

6. The computer program product of claim 4, wherein the operations further comprise:
   migrating the data set stored in the first managed space to the allocated storage space in the second managed space for the data set to be stored before the offset in the second managed space.

7. The computer program product of claim 1, wherein the request for additional storage space is for a write request having write data to add to the data set, wherein the storing the data set in the allocated storage space in the second managed space further comprises:
   writing the write data to the allocated storage space in the second managed space for the data set.

8. The computer program product of claim 7, wherein the operations further comprise:
   indicating in a volume table to perform merging for the data set;
   closing the data set;
   determining whether the volume table indicates merging for the data set in response to closing the data set; and
   migrating data in space currently allocated to the data set in the first managed space into the allocated storage space in the second managed space in response to determining that the volume table indicates merging.

9. A system for allocating managing data sets in a storage, comprising:
   a processor; and
   a computer readable storage medium having code executed by the processor to perform operations, the operations comprising:
      receiving a request for additional storage space to allocate to a data set stored in a first managed space in the storage;
      determining a revised amount of storage space for the data set comprising at least an amount of space currently allocated to the data set in the first managed space and the requested additional storage space;

determining whether the revised amount of storage space exceeds a value;

allocating, in response to determining that the revised amount of storage space exceeds the value, the revised amount of storage space in allocated storage space in a second managed space of the storage;

extending the data set including the additional storage space into the first managed space in response to determining that the revised amount of storage space does not exceed the value; and storing the data set in the allocated storage space in the second managed space.

10. The system of claim 9, wherein the value comprises a breakpoint value used to determine whether to store a new data set being added to the storage in the first managed space or the second managed space, wherein the new data set is extended into the first managed space if the new data set being added requires less space than the breakpoint value and wherein the new data set is stored in the second managed space if the new data set being added requires more space than the breakpoint value, wherein data is allocated in the first managed space using a first storage unit and data is allocated in the second managed space using a second storage unit, wherein the second storage unit includes multiples of the first storage unit.

11. The system of claim 10, wherein the first managed space comprises a track managed space managed in tracks and cylinders and the data sets stored in the track managed space occupy an integral multiple of tracks and wherein the second managed space comprises a cylinder managed space managed in multi-cylinder units and wherein the data sets stored in the cylinder managed space occupy an integral multiple of cylinders.

12. The system of claim 9, wherein the request for the additional storage space is from an access method seeking to add data to the data set in the additional storage space, wherein the operations further comprise:

determining an offset in the allocated storage space in the second managed space for the data set; and passing the offset to the access method, wherein the access method starts writing the data to add to the data set at the offset in the second managed space.

13. The system of claim 12, wherein the operations further comprise:

migrating the data set stored in the first managed space to the allocated storage space in the second managed space for the data set to be stored before the offset in the second managed space.

14. The system of claim 9, wherein the operations further comprise:

indicating in a volume table to perform merging for the data set;

closing the data set;

determining whether the volume table indicates merging for the data set in response to closing the data set; and migrating data in space currently allocated to the data set in the first managed space into the allocated storage space in the second managed space in response to determining that the volume table indicates merging.

15. A method for managing data sets in a storage, comprising:

receiving a request for additional storage space to allocate to a data set stored in a first managed space in the storage;

determining a revised amount of storage space for the data set comprising at least an amount of space currently allocated to the data set in the first managed space and the requested additional storage space;

determining whether the revised amount of storage space exceeds a value;

allocating, in response to determining that the revised amount of storage space exceeds the value, the revised amount of storage space in allocated storage space in a second managed space of the storage;

extending the data set including the additional storage space into the first managed space in response to determining that the revised amount of storage space does not exceed the value; and storing the data set in the allocated storage space in the second managed space.

16. The method of claim 15, wherein the value comprises a breakpoint value used to determine whether to store a new data set being added to the storage in the first managed space or the second managed space, wherein the new data set is extended into the first managed space if the new data set being added requires less space than the breakpoint value and wherein the new data set is stored in the second managed space if the new data set being added requires more space than the breakpoint value, wherein data is allocated in the first managed space using a first storage unit and data is allocated in the second managed space using a second storage unit, wherein the second storage unit includes multiples of the first storage unit.

17. The method of claim 16, wherein the first managed space comprises a track managed space managed in tracks and cylinders and the data sets stored in the track managed space occupy an integral multiple of tracks and wherein the second managed space comprises a cylinder managed space managed in multi-cylinder units and wherein the data sets stored in the cylinder managed space occupy an integral multiple of cylinders.

18. The method of claim 15, wherein the request for the additional storage space is from an access method seeking to add data to the data set in the additional storage space, further comprising:

determining an offset in the allocated storage space in the second managed space for the data set; and passing the offset to the access method, wherein the access method starts writing the data to add to the data set at the offset in the second managed space.

19. The method of claim 18, further comprising:

migrating the data set stored in the first managed space to the allocated storage space in the second managed space for the data set to be stored before the offset in the second managed space.

20. The method of claim 15, wherein the operations further comprising:

indicating in a volume table to perform merging for the data set;

closing the data set;

determining whether the volume table indicates merging for the data set in response to closing the data set; and migrating data in space currently allocated to the data set in the first managed space into the allocated storage space in the second managed space in response to determining that the volume table indicates merging.

* * * * *